(12) United States Patent
Dong et al.

(10) Patent No.: US 9,945,083 B2
(45) Date of Patent: Apr. 17, 2018

(54) UNIDIRECTIONAL BEND DRIVE CHAIN AND LIFT MECHANISM AND BOOM BARRIER INCLUDING SAME

(71) Applicant: Hefei University of Technology, Hefei (CN)

(72) Inventors: Mansheng Dong, Hefei (CN); Chao Zhang, Hefei (CN); Qin Shi, Hefei (CN); Yikai Chen, Hefei (CN); Zhibin Sun, Hefei (CN); Fei Tang, Hefei (CN); Shuqin Li, Hefei (CN); Shangding Gu, Hefei (CN)

(73) Assignee: Hefei University of Technology, Hefei, Anhui (CN)

( * ) Notice: Subject to any disclaimer, the term of this patent is extended or adjusted under 35 U.S.C. 154(b) by 0 days.

(21) Appl. No.: 15/508,461

(22) PCT Filed: Apr. 1, 2016

(86) PCT No.: PCT/CN2016/078364
§ 371 (c)(1),
(2) Date: Mar. 2, 2017

(87) PCT Pub. No.: WO2016/202048
PCT Pub. Date: Dec. 22, 2016

(65) Prior Publication Data
US 2017/0275836 A1    Sep. 28, 2017

(30) Foreign Application Priority Data

Jun. 18, 2015 (CN) .......................... 2015 1 0341952

(51) Int. Cl.
*E01F 13/04* (2006.01)
*F16G 13/18* (2006.01)

(52) U.S. Cl.
CPC ............ *E01F 13/046* (2013.01); *F16G 13/18* (2013.01)

(58) Field of Classification Search
CPC ........ E01F 13/046; F16G 13/18; F16G 13/20; F16G 13/06; F16G 13/12; F16G 13/14
See application file for complete search history.

(56) References Cited

U.S. PATENT DOCUMENTS 2,755,122 A * 7/1956 Salo ........................ E05F 11/06
292/264
3,012,635 A * 12/1961 Blain ........................ B66F 3/06
187/250

(Continued)

FOREIGN PATENT DOCUMENTS

| CN | 2649736 Y | 10/2004 |
|---|---|---|
| CN | 2771564 Y | 4/2006 |

(Continued)

OTHER PUBLICATIONS

International Search Report and Written Opinion for PCT/CN2016/078364, dated Jul. 5, 2016, 7 pages.
Search Report for CN201510341952.4, dated Jan. 26, 2016.

*Primary Examiner* — Abigail A Risic
(74) *Attorney, Agent, or Firm* — Klarquist Sparkman, LLP

(57) ABSTRACT

A unidirectionally bendable transmission chain. At a first side thereof, an inner stop plate is fixed between a pair of inner chain plates at both ends of pin shafts, and an outer stop plate is fixed between a pair of outer chain plates at both ends of the pin shafts. Both ends of the inner stop plate are flush with axes of pin holes provided at both ends of the inner chain plates, and both ends of the outer stop plate are respectively provided with extensions beyond the outer chain plates; the extensions of the outer stop plate form a one-sided support for the inner stop plate to prevent the (Continued)

transmission chain from bending toward the first side, thus the transmission chain bends unidirectionally toward a second side opposite to the first side. A hoisting mechanism and a liftable roadblock having the above transmission chain.

4 Claims, 3 Drawing Sheets

(56) References Cited

U.S. PATENT DOCUMENTS

| | | | | |
|---|---|---|---|---|
| 3,759,035 | A * | 9/1973 | Schmidberger | F16G 13/06 59/78.1 |
| 4,096,943 | A * | 6/1978 | Gentsch | B65G 17/12 198/793 |
| 4,878,345 | A * | 11/1989 | Bechtold | B21L 9/065 59/13 |
| 4,941,316 | A * | 7/1990 | Bechtold | B21L 9/065 292/264 |
| 5,042,244 | A * | 8/1991 | Worsley | B65G 17/42 198/851 |
| 8,695,320 | B2 * | 4/2014 | Scolari | F16G 13/20 198/784 |
| 2009/0133375 | A1 * | 5/2009 | Wu | F16G 13/06 59/93 |
| 2012/0198809 | A1 * | 8/2012 | Scolari | F16G 13/20 59/84 |
| 2014/0329632 | A1 * | 11/2014 | Kranz | F16G 13/18 474/206 |
| 2014/0338303 | A1 * | 11/2014 | Shoji | F16G 13/20 59/93 |
| 2016/0169325 | A1 * | 6/2016 | Hogan | F16G 15/12 59/84 |

FOREIGN PATENT DOCUMENTS

| | | |
|---|---|---|
| CN | 201400451 Y | 2/2010 |
| CN | 201801825 U | 4/2011 |
| CN | 104265835 A | 1/2015 |
| CN | 204140779 U | 2/2015 |
| CN | 104894996 A | 9/2015 |
| EP | 0027660 A1 | 4/1981 |
| JP | H1072109 A | 3/1998 |
| KR | 20080001242 U | 5/2008 |

* cited by examiner

UNIDIRECTIONAL BEND DRIVE CHAIN AND LIFT MECHANISM AND BOOM BARRIER INCLUDING SAME

CROSS REFERENCE TO RELATED APPLICATIONS

This is the U.S. National Stage of International Application No. PCT/CN2016/078364, filed Apr. 1, 2016, which was published in Chinese under PCT Article 21(2), which in turn claims the benefit of China Application No. 201510341952.4, filed Jun. 18, 2015.

TECHNICAL FIELD

The present invention relates to the technical field of mechanics, and particularly to a unidirectionally bendable transmission chain and a hoisting mechanism and a liftable roadblock having the same.

BACKGROUND ART

Transmission chains are applied quite commonly, but no report on unidirectionally bendable transmission chains has been disclosed so far.

Trafficability at grade crossings of a city is an important part of city traffic. In order to ensure traffic safety at the grade crossings of the city, besides the provision of complete traffic signaling facilities, manual management is often combined. An important issue of the manual management is to instruct pedestrians at an entrance of a pedestrian crossing to pass in order according to the traffic signals. However, the situation where the pedestrians do not obey the instruction often happens, and then roadblocks are accordingly set up to prevent the pedestrians from violating regulations to pass at will. The corresponding facilities further include roadblocks set up at entrances of some venues to make it convenient to manage vehicles and pedestrians.

There are various types of roadblocks in the prior art, including a translational roadblock, a rotary roadblock, a hydraulic roadblock and the like. Among others, the translational roadblock and the rotary roadblock each occupy too much space at an intersection which is already confined, and they require a lot of time to reach their positions, which prolongs the passing time; and in the case of the hydraulic roadblock, there is a need to establish a hydraulic station and oil pipes, which also occupy a large space and are required to be installed and maintained frequently, with a high cost.

DISCLOSURE OF THE INVENTION

In order to solve the above problems in the prior art, the present invention provides a unidirectionally bendable transmission chain and a hoisting mechanism and a liftable roadblock having the unidirectionally bendable transmission chain. The unidirectionally bendable transmission chain provided according to the present invention has a simple structure and reliable functions, and can be efficiently prevented from partial protuberance under pressure. The hoisting mechanism and the liftable roadblock having the transmission chain, provided according to the present invention, have reliable operation, low cost and easy maintenance, as well as advantages of rapid response and a short time required to reach their positions. Besides, the liftable roadblock no longer occupies the space and thus does not obstruct the traffic, when not used.

In one aspect, the present invention provides a unidirectionally bendable transmission chain, comprising inner chain plates and outer chain plates connected through pin shafts in pin holes. The inner chain plates and the outer chain plates are arranged in pairs at both ends of the pin shafts in an alternating mode. Rollers are sheathed over the pin shafts. At a first side of the transmission chain, an inner stop plate is fixedly connected between a pair of the inner chain plates at the both ends of the pin shafts, with both ends of the inner stop plate being respectively flush with axes of the pin holes provided at both ends of the inner chain plates; an outer stop plate is fixedly connected between a pair of the outer chain plates at the both ends of the pin shafts, with both ends of the outer stop plate respectively provided with extensions beyond the outer chain plates, respectively, and the extensions of adjacent outer stop plates not interfering with one another.

The extensions form a one-sided support for the inner stop plate to prevent the transmission chain from bending toward the first side, so that the transmission chain bends unidirectionally toward a second side, the first side and the second side of the transmission chain being located at opposite positions.

In another aspect, the present invention provides a hoisting mechanism, comprising two unidirectionally bendable transmission chains provided by the present invention, which are a first chain and a second chain, respectively.

One end of the first chain and one end of the second chain are arranged as parallel vertical sections, with the first side of the first chain and the first side of the second chain abutting against each other in a back-to-back manner in the vertical sections. A guide plate is arranged fixedly in a horizontal direction, with both the vertical section of the first chain and the vertical section of the second chain confined within the guide plate. A hoisting platform is fixedly arranged on top surfaces of the first chain and the second chain at the top of the vertical sections, a first power gear engaging with the first chain and a second power gear engaging with the second chain are arranged respectively at lower portions of the vertical sections and located under the guide plate. The first power gear and the second power gear transmit power synchronously in opposite directions.

The other end of the first chain and the other end of the second chain are arranged as winding sections following the vertical sections. The first chain and the second chain in the winding sections are wound in their respective reels in their respective unidirectional bending directions to form a first chain disk and a second chain disk, respectively. The reels are fixedly arranged on a body frame.

Further, guide rollers are arranged in the guide plate, and the guide rollers are arranged in pair at the second side of the first chain and the second side of the second chain.

In a further aspect, the present invention provides a liftable roadblock, comprising a plurality of hoisting mechanisms provided by the present invention which are arranged in a row at a same height. The vertical sections of the plurality of hoisting mechanisms, after being hoisted, row up in parallel to form the liftable roadblock. The guide plates and the portions under the guide plates of the plurality of hoisting mechanisms are embedded under a road surface to function as an underground structure. The hoisting platforms of the plurality of hoisting mechanisms are connected integrally and can be lowered to be flush with the ground. The first power gears and the second power gears of the plurality of hoisting mechanisms are arranged coaxially, respectively.

The unidirectionally bendable transmission chain and the hoisting mechanism and the liftable roadblock having the transmission chain, which are provided according to the present invention, can bring about at least one of the following beneficial effects:

1. the unidirectionally bendable transmission chain provided by the present invention has a simple structure and reliable functions;
2. the hoisting mechanism provided by the present invention operates reliably;
3. the liftable roadblock provided by the present invention is kept entirely under the ground and does not occupy road space when not used; and it can be hoisted as appropriate, for example, the liftable roadblock is raised up when the red traffic light is on, and the liftable roadblock is lowered directly to be flush with the road surface so as not to affect the normal traffic when the green traffic light is on;
4. the liftable roadblock provided by the present invention adopts a lifting structure with dual transmission chains, which requires a short time to be in place; in addition, the two unidirectionally bendable transmission chains move vertically and thus have a short movement path; furthermore, a motor is used to provide driving, which further reflects the advantage of sensitive response, that is, the entire liftable roadblock can respond rapidly and reach its position quickly; and besides, the liftable roadblock no longer occupies space and thus does not obstruct the traffic when not used;
5. the liftable roadblock provided by the present invention is driven by a motor, and it has a low manufacture cost, a simple structure, easy maintenance and a low usage cost; and
6. the unidirectionally bendable transmission chain provided by the present invention stimulates human joints which are unidirectionally bendable and vertical in an opposite direction, this makes it possible to efficiently prevent the transmission chain from partially protruding under pressure; under constraints from both the hoisting platform and the guide plate, linear sections of the transmission chains can reliably move along a straight line, and one end of the transmission chain can provide pressure to the outside when the other end thereof is under pressure.

Figure 1A:
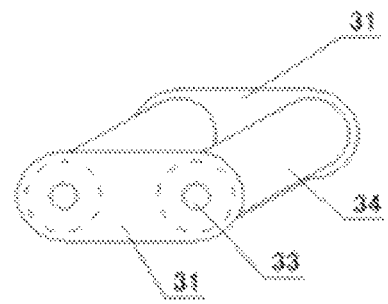
FIG. 1a is a schematic structural diagram of an inner chain link, formed by inner chain plates, pin shafts and rollers, of a unidirectionally bendable transmission chain provided by an embodiment of the present invention.

Reference numerals: first chain 11; first chain disk 11a; second chain 12; second chain disk 12a; guide plate 13; hoisting platform 14; first power gear 21; first motor 21a; second power gear 22; second motor 22a; inner chain plate 31; inner stop plate 31a; outer chain plate 32; outer stop plate 32a; pin shaft 33; and roller 34.

DETAILED DESCRIPTION OF EMBODIMENTS

Exemplary embodiments of the present invention will be introduced below in detail with reference to the drawings. These exemplary embodiments are provided for the purpose of enabling those skilled in the art to clearly understand the invention and carry out the invention based on the description herein. The drawings and specific embodiments are not intended to limit the invention, and the scope of the invention is defined by the appending claims.

Figure 1B:
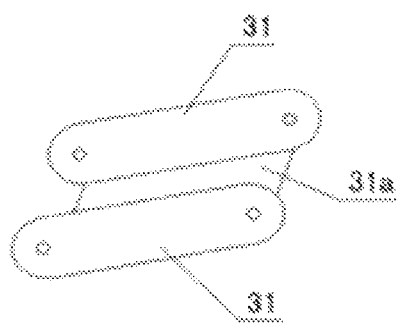
FIG. 1b is a schematic structural diagram of the inner chain plates, provided with an inner stop plate, of the unidirectionally bendable transmission chain provided by an embodiment of the present invention.
Figure 1C:
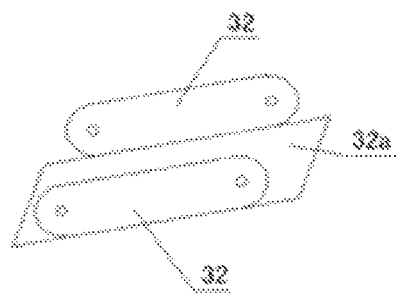
FIG. 1c is a schematic structural diagram of outer chain plates, provided with an outer stop plate, of the unidirectionally bendable transmission chain provided by an embodiment of the present invention.

Referring to FIGS. 1a, 1b and 1c, a unidirectionally bendable transmission chain in the embodiment is formed by connecting inner chain plates 31 and outer chain plates 32 through pin shafts 33 in pin holes. Rollers 34 are sheathed over the pin shafts 33. Both the inner chain plates 31 and the outer chain plates 32 appear in pairs.

At a first side of the transmission chain, an inner stop plate 31a is fixedly connected between a pair of the inner chain plates 31, and an outer stop plate 32a is fixedly connected between a pair of the outer chain plates 32. Both ends of the inner stop plate 31a are respectively flush with axes of the pin holes provided at both ends of the inner chain plates 31, and the outer stop plate 32a has extensions at both ends thereof.

Figure 2A:
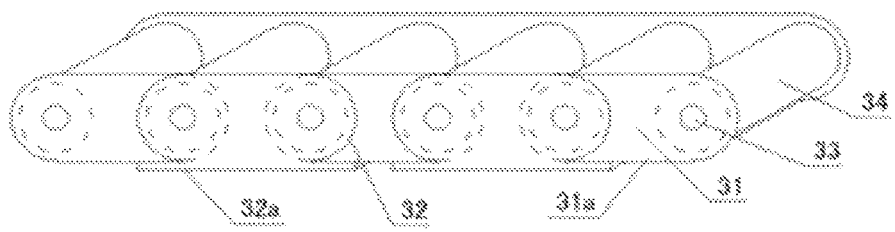
FIG. 2a is a schematic three-dimensional structural diagram of the unidirectionally bendable transmission chain provided by an embodiment of the present invention.
Figure 2B:
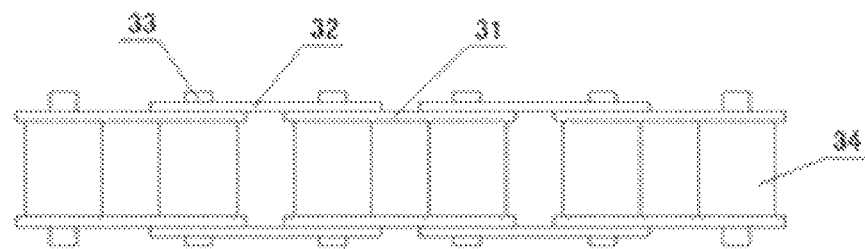
FIG. 2b is a schematic structural diagram from the front view of the unidirectionally bendable transmission chain provided by an embodiment of the present invention.
Figure 2C:
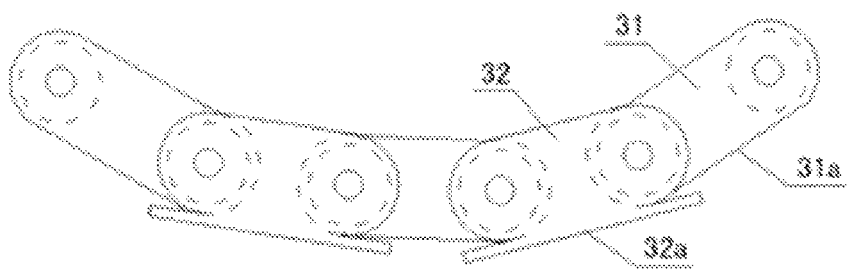
FIG. 2c is a schematic structural diagram from the side view of the unidirectionally bendable transmission chain provided by an embodiment of the present invention.

Referring to FIGS. 2a, 2b and 2c, in the embodiment, the extensions of the outer stop plate 32a form a one-sided support for the inner stop plate 31a to prevent the transmission chain from bending toward the first side, whereas the transmission chain can bend unidirectionally toward a second side. The first side and the second side of the transmission chain are located at opposite positions, and adjacent outer stop plates 32a do not interfere with one another.

Figure 3A:
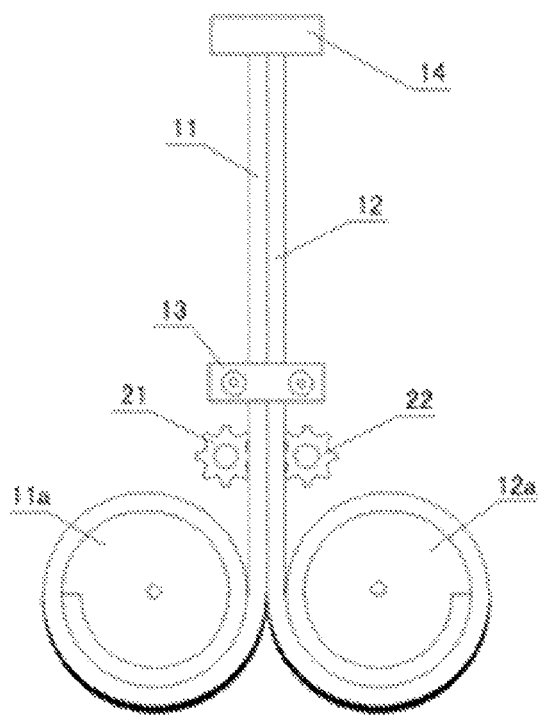
FIG. 3a is a schematic structural diagram of a hoisting mechanism having unidirectionally bendable transmission chains provided by an embodiment of the present invention.
Figure 3B:
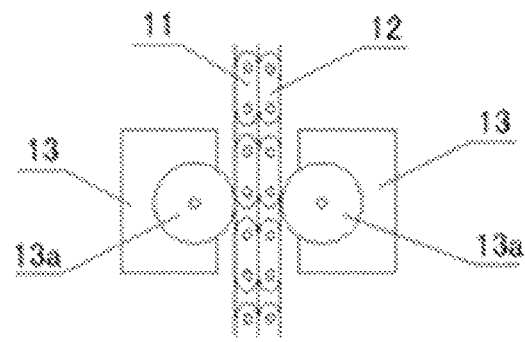
FIG. 3b is a schematic structural diagram of a guide plate of the hoisting mechanism provided by an embodiment of the present invention.

Referring to FIGS. 3a and 3b, in the embodiment, a hoisting mechanism is formed by the unidirectionally bendable transmission chains, and the structure thereof is arranged as follows:

two unidirectionally bendable transmission chains, which are a first chain 11 and a second chain 12 respectively, are used; and one end of the first chain 11 and one end of the second chain 12 are arranged as parallel vertical sections, and the first chain 11 and the second chain 12 are in a back-to-back form in the vertical sections with the first sides of the transmission chains abutting against each other; a guide plate 13 is arranged horizontally and fixedly, with the first chain 11 and the second chain 12 in the vertical sections confined within the guide plate 13; a hoisting platform 14 is fixedly arranged on top surfaces of the first chain 11 and the second chain 12 at the top of the vertical sections, a first power gear 21 engaging with the first chain and a second power gear 22 engaging with the second chain are arranged at lower portions of the vertical sections and located under the guide plate 13, and the first power gear 21 and the second power gear 22 transmit power synchronously in opposite directions.

As shown in FIG. 3b, guide rollers 13a are arranged in the guide plate 13. The guide rollers 13a are located at opposite positions outside the first chain 11 and the second chain 12 which are in a back-to-back state, and form a pair of rollers. The pair of rollers can be used not only to guide the transmission chains, but also as a position-limiting structure to ensure that the first chain 11 and the second chain 12 are in the back-to-back state.

The other end of the first chain 11 and the other end of the second chain 12 are arranged as winding sections following the vertical sections. The first chain 11 and the second chain 12 in the winding sections are wound in their respective reels in their respective unidirectional bending directions to form chain disks, specifically, the first chain 11 is wound to form a first chain disk 11a, and the second chain 12 is wound to form a second chain disk 12a. The reels are fixedly arranged on a body frame.

As shown in FIG. 3a, when the first power gear 21 rotates clockwise and the second power gear 22 rotates anticlockwise synchronously, the first chain 11 is wound onto the first chain disk 11a, and at the same time, the second chain 12 is wound onto the chain disk 12a, thereby making the hoisting platform 14 lowered. Reversely, when the second power gear 22 rotates clockwise and the first power gear 21 rotates anticlockwise synchronously, the first chain 11 is unwound from the first chain disk 11a, and at the same time, the second chain 12 is unwound from the second chain disk 12a, thereby making the hoisting platform 14 raised.

Figure 4:
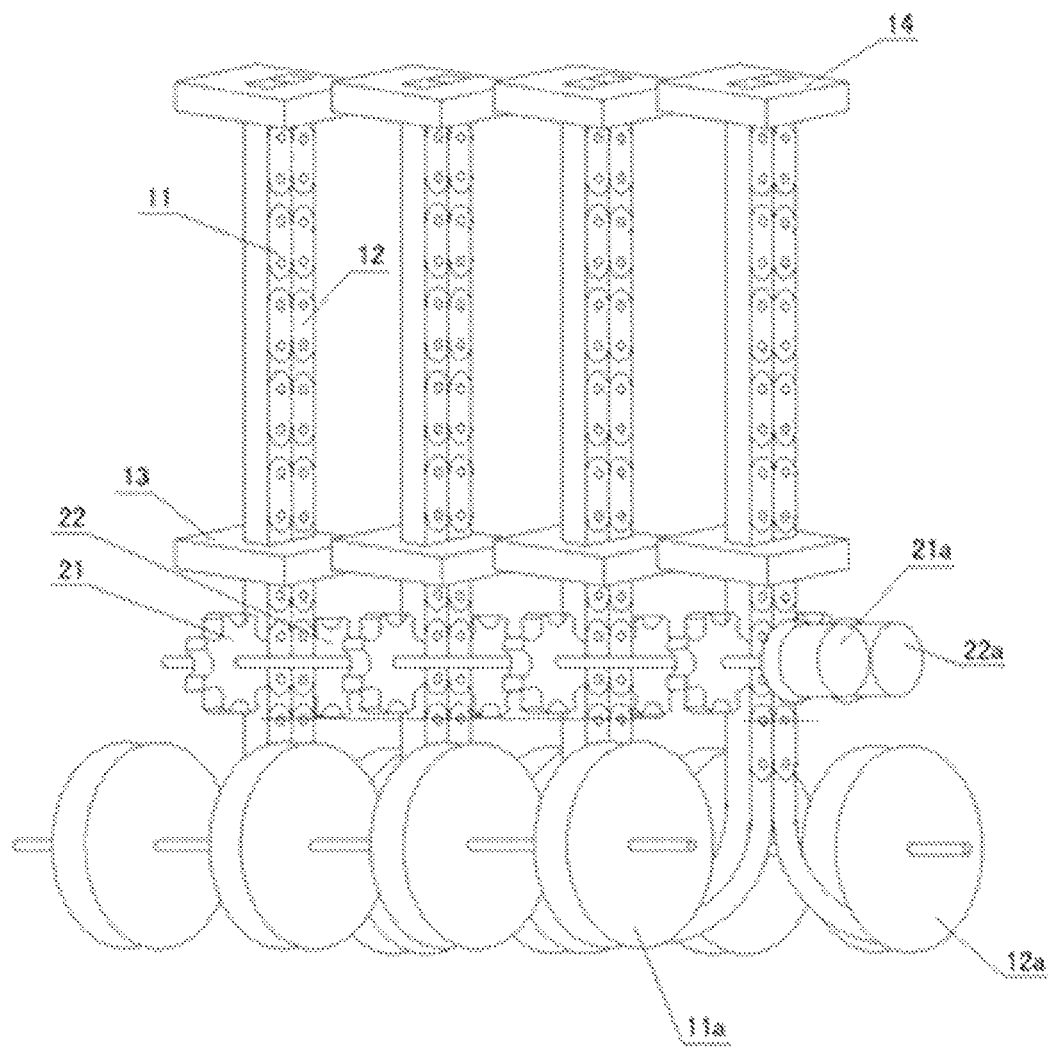
FIG. 4 is a schematic structural diagram of a liftable roadblock provided by an embodiment of the present invention.

Referring to FIG. 4, in the embodiment, a liftable roadblock is formed with the hoisting mechanisms, and the structure thereof is arranged as follows:

multiple hoisting mechanisms are arranged in a row at a same height, so that the vertical sections of the individual hoisting mechanisms, after being hoisted, row up in parallel to form the liftable roadblock; the guide plate 13 and the portions under the guide plate of each hoisting mechanism are embedded under a road surface to function as an underground structure, and the hoisting platforms of the individual hoisting mechanisms are connected integrally and can be lowered to be flush with the ground; and the first power gears 21 of the individual hoisting mechanisms are arranged coaxially and driven by a first motor 21a, and the second power gears 22 of the individual hoisting mechanisms are arranged coaxially and driven by a second motor 22a.

Since the multiple hoisting mechanisms are arranged in a row at the same height and they are raised or lowered synchronously, the liftable roadblock is formed. Furthermore, linkage between the liftable roadblock and signal lights can be achieved with a control unit further provided. If a manual control unit is coordinately provided, manual control can be achieved to meet the demand for the raising or lowering operation that may occur at any time.

The above-mentioned embodiments are merely preferred embodiments of the present invention, and are not intended to limit the present invention. It would be understood by those skilled in the art that various modifications and variations can be made to the present invention. Any modifications, equivalent alternatives, improvements and the like, made without departing from the spirit and principle of the present invention, should fall within the scope of protection of the invention.

We claim:

1. A unidirectionally bendable transmission chain, comprising inner chain plates and outer chain plates connected through pin shafts in pin holes, the inner chain plates and the outer chain plates being arranged in pairs at both ends of the pin shafts in an alternating mode, with rollers sheathed over the pin shafts, wherein at a first side of the transmission chain, an inner stop plate is fixedly connected between a pair of the inner chain plates at the both ends of the pin shafts, with both ends of the inner stop plate being respectively flush with axes of the pin holes provided at both ends of the inner chain plates; an outer stop plate is fixedly connected between a pair of the outer chain plates at the both ends of the pin shafts, with both ends of the outer stop plate respectively provided with extensions beyond the outer chain plates, and the extensions of adjacent outer stop plates not interfering with one another; and the extensions form a one-sided support for the inner stop plate to prevent the transmission chain from bending toward the first side, so that the transmission chain bends unidirectionally toward a second side, the first side and the second side of the transmission chain being located at opposite positions.

2. A hoisting mechanism, comprising two unidirectionally bendable transmission chains according to claim 1, which are a first chain and a second chain, respectively, wherein one end of the first chain and one end of the second chain are arranged as parallel vertical sections, with the first side of the first chain and the first side of the second chain abutting against each other in a back-to-back manner in the vertical sections; a guide plate is arranged fixedly in a horizontal direction, with both the vertical section of the first chain and the vertical section of the second chain confined within the guide plate; a hoisting platform is fixedly arranged on top surfaces of the first chain and the second chain at the top of the vertical sections, a first power gear engaging with the first chain and a second power gear engaging with the second chain are respectively arranged at lower portions of the vertical sections and located under the guide plate, and the first power gear and the second power gear transmit power synchronously in opposite directions;

the other end of the first chain and the other end of the second chain are arranged as winding sections following the vertical sections; the first chain and the second chain in the winding sections are wound in their respective reels in their respective unidirectional bending directions to form a first chain disk and a second chain disk, respectively, and the reels are fixedly arranged on a body frame.

3. The hoisting mechanism according to claim 2, wherein guide rollers are arranged in the guide plate, and the guide rollers are arranged in pair at the second side of the first chain and the second side of the second chain.

4. A liftable roadblock, comprising a plurality of hoisting mechanisms according to claim 2 which are arranged in a row at a same height, wherein the vertical sections of the plurality of hoisting mechanisms, after being hoisted, row up in parallel to form the roadblock; the guide plates and portions under the guide plates of the plurality of hoisting mechanisms are embedded under a road surface to function as an underground structure, and the hoisting platforms of the plurality of hoisting mechanisms are connected integrally and can be lowered to be flush with the ground; and the first power gears and the second power gears of the plurality of hoisting mechanisms are arranged coaxially, respectively.

\* \* \* \* \*